Nov. 28, 1939.   N. S. REYNOLDS   2,181,203
GREASE RETAINER
Filed April 18, 1938
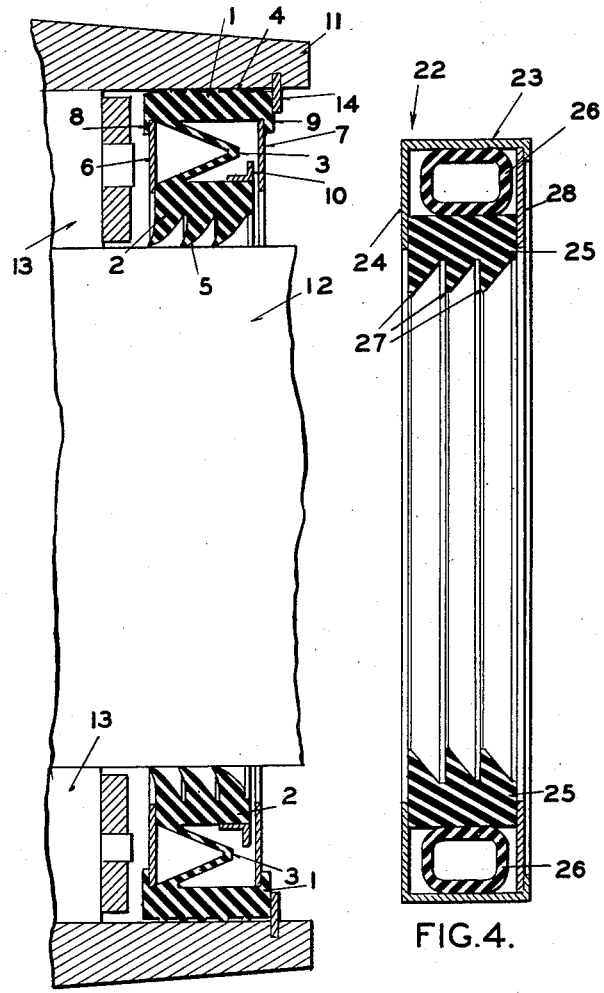
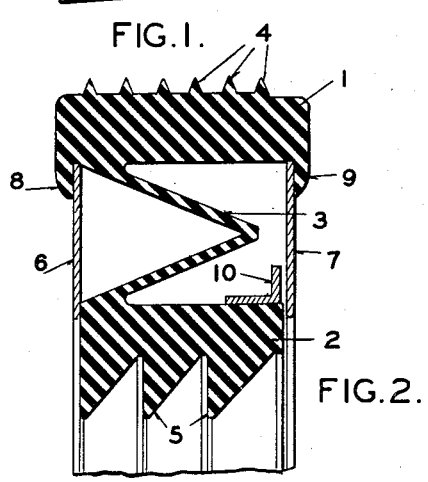
FIG.2.
INVENTOR.
N. S. REYNOLDS
BY
ATTORNEY.

Patented Nov. 28, 1939

2,181,203

UNITED STATES PATENT OFFICE 2,181,203

GREASE RETAINER

Noel S. Reynolds, St. Louis, Mo., assignor of one-half to Otto Bartling, St. Louis, Mo.

Application April 18, 1938, Serial No. 202,756

4 Claims. (Cl. 288—3)

My invention relates to seals of the type employed between two relatively movable members such as a rotating member and a fixed member to thereby prevent leakage of oil, grease or other fluids between said members.

One of the objects of my invention is to produce a seal of the kind referred to that will efficiently perform the desired sealing function for a long period of time and which is so constructed that any eccentricities caused by bearing wear between the relatively rotatable members with which the seal is associated will not result in such wear as to destroy the seal or decrease its sealing efficiency.

Another and more specific object of my invention is to produce a seal that can be built as a unit from rubber, rubber compound, synthetic rubber or other suitable material and which does not require any springs or other separate resilient pressure producing elements to maintain an efficient sealing action.

Other objects of my invention will become apparent from the following description taken in connection with the accompanying drawing in which Figure 1 is a cross-sectional view of a wheel hub and axle race having associated therewith a seal or grease retainer embodying my invention; Figure 2 is an enlarged cross-sectional view of a portion of the seal showing its form prior to being placed in operative position; and Figures 3 and 4 are cross-sectional views of modified constructions.

Referring to Figures 1 and 2, the seal comprises an outer annular element 1 and an inner annular element 2 spaced therefrom and connected to the outer element by an annular integral thin web 3 of V-shaped cross section. The outer surface of the outer element 1 is formed with a plurality of axially spaced annular ribs 4 for sealing engagement with one of the relatively rotatable members with which the seal is to be associated. The inner member 2 is formed with annular projections 5, three being shown although one or two may be sufficient. These projections are of saw-tooth shape in cross section in order to produce the proper edge for engagement with the other relatively rotatable member.

In order to give support to the outer annular element 1 and insure that it will perform its sealing action, there is provided two metal washers 6 and 7 which are held in position by integral flanges 8 and 9 on the outer element 1. The washers are of such depth as to lie along side the inner element in order to prevent it from any substantial relative axial movement but not interfere with its relative radial movement with respect to the outer element 1. There is also provided a non-expansible band 10 surrounding the inner element 2 for preventing this element from expanding or assuming an "out of round" shape that would cause the seal to be ineffective. The band is held in position by the washer 7.

The outer element, the inner element and the thin connecting web are molded as a unit preferably from a synthetic rubber compound which is so compounded as to have a good wear factor. The compound is also impregnated with graphite to furnish a lubricant and thus decrease rapid wear. Other materials may also be used for making the seal, if desired, as for example, rubber, rubber compound, and so forth.

In Figure 1 the seal or grease retainer is shown, by way of example, associated with the hub and axle race of a motor vehicle. The wheel hub 11 rotates about the axle race 12 on the bearings 13. The outer element 1 of the seal is made slightly oversize with respect to the inner diameter of the hub so that when the seal is forced into position in the hub, ribs 4 will yield and be held in tight sealing contact with the hub surface and with sufficient friction that the seal will rotate with the hub. Continuous sealing contact is insured by the washers 6 and 7. The diameter of the opening formed by the projections 5 is preferably made slightly less than the diameter of the axle race so that the sharp edges of the projections will be bent slightly, as shown, when when the seal is forced on the race. The edges of the projections will thus be maintained in tight engagement with the race, which rotates relatively thereto, to secure a good sealing action. The edges of the projections, if desired, may be slightly thicker than as shown so that the projections will only be compressed when the seal is placed on the race, instead of bent slightly, to secure the proper sealing action. The seal is held in position on the hub by the locking ring 14.

With the seal associated with the hub and axle race, as shown in Figure 1, no oil or grease will be able to pass outwardly from the bearing due to the sealing action between the outer element and the hub and the sealing action between the inner element and the axle race. Due to the high wear factor of the material used in making the seal and the impregnated graphite, there will be little wear on the projections 5.

The thin web 3 connecting the outer and inner elements of the seal is a very important feature of my invention. By this construction the elements 1 and 2 may have susbtantially free relative radial movement without in any way affecting their respective sealing functions. As the cooperating surfaces between the hub, the bearings and the axle race wear, a certain amount of play develops which will result in hub 11 rotating about an axis different from the axis of the race, thereby producing an eccentric action. If the elements 1 and 2 were not free to move radially relative to each other, this eccentric action would cause the inner element 2 to receive excessive wear, thus tending to decrease the efficiency of the seal. Since the inner element is free to move radially because of the thin web, it will rotate about the axis of the race and the possibility of wear from the eccentric action will be eliminated.

I am aware that it has been proposed to construct an annular seal of rubber or other suitable material having a U-shaped cross section with the sides thereof adapted to engage the relatively rotatable members. In such a construction the sides or sealing portions do not have the proper free relative radial movement because of the thickness of the connecting base part which must be substantially as thick as the sides to give the proper flare to the sealing portions to hold them in sealing contact with the relatively rotatable members. Also because of the thickness of the connecting base portion which presents considerable resistance to any free relative radial movement of the sides or sealing portions, the sealing portion which engages the rotating member will wear rapidly, thus shortening the efficient life of the seal. These undesirable features are eliminated by my novel seal.

Referring to the modified construction shown in Figure 3, the seal comprises an outer annular element 15, an inner annular element 16 and an integral connecting web 17 of bellows shape, all molded from the same material. The outer surface of element 15 is provided with annular ribs 18 and the inner element with annular projections 19 of the type already described with respect to the construction shown in Figures 1 and 2. An annular supporting ring 20 of metal engages the inner surface of the outer element 15 to hold this element in sealing engagement with the surface with which it is adapted to cooperate. A band 21 surrounds the inner element 16 and prevents it from expanding. The operation of this modified construction is the same as the preferred construction already described. The bellows-like connecting web permits radial movement between the inner and outer elements 15 and 16, thus preventing any eccentric action of the members with which the seal is associated from wearing the inner element in an undesirable manner.

In the modification shown in Figure 4, the outer annular element is replaced by a metal annular housing 22 having a cylindrical portion 23 and a radial flange 24, the cylindrical portion having a tight sealing fit with the outer member of the relatively rotatable members with which the seal is associated. The seal also comprises an inner annular element 25 and a separate annular tubular element 26 interposed between said element 25 and the housing. The inner element is formed with integral annular projections 27 of the type already described for engaging the other relatively rotatable member with which the seal is associated to thus produce the desired sealing action. The inner element 25 is molded separately from the tubular element 26 but in assembling the seal, the tubular element is bonded to element 25 and also to the cylindrical portion of housing 22. An annular washer 28 completes the housing construction, it being held in position by turning over the edge of the cylindrical portion 23. The side walls of the tubular element are of such thickness as to permit the housing and the inner element to have the necessary free radial movement to prevent any eccentric action of the relatively rotatable members with which the seal is associated from causing undesirable wear of the inner element 25 and thus decreasing the efficiency of the sealing engagement.

Being aware of the possibility of other modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a sealing device of the class described for cooperation with relatively rotatable members, an outer annular element for engagement with one of the members, an inner annular element of yieldable material spaced from the outer annular element, said last named element being provided with an annular integral projection having a resilient edge for yieldable engagement with the other of the relatively rotatable members, a flexible wall between the inner surface of the outer element and the outer surface of the inner element, said wall having such a degree of flexibility that substantially free relative radial movement between the elements will be permitted and no appreciable resistance offered to the expansion of the inner element, and a non-expansible member surrounding and engaging the outer surface of the inner element.

2. In a sealing device of the class described for cooperation with relatively rotatable members, an outer annular element provided with a plurality of annular spaced ribs on its outer surface for engagement with one of the members, an inner annular element spaced from the outer element and provided with an annular projection having a resilient edge for engagement with the other of the relatively rotatable members, and a flexible wall between the inner and outer elements, said inner and outer elements and said wall being formed integral from yieldable material and said wall being positioned between the axial limits of the elements and of such flexibility that free relative radial movement between the elements will be permitted.

3. In a sealing device of the class described for cooperation with relatively rotatable members, an outer annular element for engagement with one of the members, an inner annular element spaced from the outer element and provided with an annular projection having a resilient edge for engagement with the other of the relatively rotatable members, a flexible wall between the inner and outer elements, said inner and outer elements and said wall being formed integral from yieldable material and said wall being so positioned between the elements and of such flexibility that free relative radial movement between the elements will be permitted, and a non-contractable member engaging the inner surface of the outer element for maintaining it in uniform frictional engagement with the relatively rotatable member with which it cooperates.

4. In a sealing device of the class described for cooperation with relatively rotatable members, an outer annular element for engagement with one of the members, an inner annular element spaced from the outer element and provided with an annular projection having a resilient edge for engagement with the other of the relatively rotatable members, a flexible wall between the inner and outer elements, said inner and outer elements and said wall being formed integral from yieldable material and said wall being so positioned between the elements and of such flexibility that free relative radial movement between the elements will be permitted, a non-expansible band surrounding the outer surface of the inner element, and a non-contractable annular member engaging the inner surface of the outer element.

NOEL S. REYNOLDS.